United States Patent
Young et al.

(10) Patent No.: US 6,915,039 B2
(45) Date of Patent: Jul. 5, 2005

(54) LIGHT COLLECTORS WITH ANGLED INPUT SURFACES FOR USE IN AN ILLUMINATION SYSTEM

(75) Inventors: Joe Parton Young, Sparta, TN (US); George Robert Hulse, Cookeville, TN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 171 days.

(21) Appl. No.: 10/287,999

(22) Filed: Nov. 5, 2002

(65) Prior Publication Data

US 2004/0086223 A1 May 6, 2004

(51) Int. Cl.7 .............................. G20B 6/26; G02B 6/42
(52) U.S. Cl. ............................ 385/31; 385/26; 385/47
(58) Field of Search ............................ 385/26, 31, 147, 385/901

(56) References Cited

U.S. PATENT DOCUMENTS

| | | | |
|---|---|---|---|
| 4,669,034 A | 5/1987 | Bansbach et al. | |
| 4,826,273 A | 5/1989 | Tinder et al. | |
| 4,936,663 A * | 6/1990 | Mori | 385/31 |
| 4,954,930 A * | 9/1990 | Maegawa et al. | 362/26 |
| 5,163,105 A * | 11/1992 | Knoll et al. | 385/44 |
| 5,357,592 A * | 10/1994 | Neilson | 385/47 |
| 5,436,805 A | 7/1995 | Hsu et al. | |
| 5,508,513 A * | 4/1996 | Genovese | 250/227.26 |
| 5,835,649 A | 11/1998 | Turner et al. | |
| 5,845,038 A * | 12/1998 | Lundin et al. | 362/551 |
| 5,934,782 A | 8/1999 | Atkins et al. | |
| 5,991,048 A | 11/1999 | Karlson et al. | |
| 6,139,176 A * | 10/2000 | Hulse et al. | 362/581 |
| 6,367,941 B2 * | 4/2002 | Lea et al. | 362/31 |
| 6,473,554 B1 * | 10/2002 | Pelka et al. | 385/146 |
| 2002/0172459 A1 * | 11/2002 | Bailey et al. | 385/31 |

* cited by examiner

Primary Examiner—John D. Lee
Assistant Examiner—Tina M Lin
(74) Attorney, Agent, or Firm—Howard & Howard (57) ABSTRACT

A light collector for use with an illumination system, particularly an automotive interior illumination system. The light collector includes several waveguides capable of conducting light through internal reflection with the waveguides being arranged in a stacked configuration. Each waveguide includes an angled input surface at least some of which are oriented at different angles. With this arrangement, light from a single light source can be collected and routed to several locations.

19 Claims, 4 Drawing Sheets

LIGHT COLLECTORS WITH ANGLED INPUT SURFACES FOR USE IN AN ILLUMINATION SYSTEM

FIELD OF THE INVENTION

The present invention relates generally to light collectors used in connection with distributed illumination systems. More specifically, the present invention relates to light collectors that utilize multiple waveguides for collecting and distributing light emitted from a single light source.

BACKGROUND OF THE INVENTION

Waveguides are devices that due to their composition, shape, and other design characteristics exhibit the ability of being able to conduct light via internal reflection. This quality has been extensively utilized in a wide spectrum of applications, ranging from illumination systems to telecommunications networks. Light transmitting applications relating to illumination systems have particular concerns, among them is the manner in which light is collected by the waveguide for subsequent distribution. The light collector of the present invention addresses this and other concerns.

Illumination systems and other light conducting devices have utilized a variety of different configurations for the purpose of collecting and distributing light; one example being shown in U.S. Pat. No. 5,357,592 issued to Neilson. The Neilson patent discloses an optical energy gathering device in the form of a sheet of transparent material with a plurality of light collector disks attached to the sheet that collect and route light through the sheet. The light collectors are disks, each having angled outer edges that internally reflect light impinging upon the disk at its outer edges. The disks can have an outer edge angle that is uniform around the perimeter of the disks, or can include different input edge angles on opposing sides of the disk to accommodate the collection of light that impinges upon the disk at an angle relative to the normal to the disk surface.

Optical devices with angled input surfaces have also been previously used in illumination systems. For example, U.S. Pat. No. 4,669,034 issued to Bansbach et al. discloses a glare prevention device in the form of a series of stacked, annular rings, each having an angled input surface. A light source located at the center of the device radiates light into the stacked rings with the angled input surfaces operating to direct the light upwardly and downwardly, thereby preventing lateral glare from the device. Each of the rings directly receives a portion of the light emitted by the source and is used primarily to refract the light to prevent glare, although a limited amount of internal reflection may occur in each ring.

Neither of the above-noted patents address all of the various considerations involved in a distributed illumination system of the type that uses waveguides to collect and route light to remote locations, especially those involving spatial constraints such as is often present in automotive illumination systems. Accordingly, it would be advantageous to provide a light collector, wherein light from a single source was collected and distributed via separate waveguides to remote areas of an illumination system that is employed in an application having limited space.

SUMMARY OF THE INVENTION

The present invention provides a light collecting apparatus for collecting and distributing light in an illumination system having a light source. The apparatus comprises a first waveguide capable of conducting light by internal reflection and having a first angled input surface which is capable of collecting light emitted by the light source. The light collecting apparatus also comprises a second waveguide capable of conducting light by internal reflection and having a second angled input surface which is capable of collecting light emitted by the light source. The first and second waveguides are stacked with the first and second angled input surfaces being oriented at different angles such that a first portion of the light emitted by the light source is collected by the first angled input surface and conducted through said first waveguide by internal reflection, and a second portion of the light emitted by the light source is collected by the second angled input surface and conducted through said second waveguide by internal reflection.

In accordance with another aspect of the invention, there is provided a light collecting apparatus that includes a plurality of waveguides each having a notch used to collect light from a common source. The apparatus comprises a first waveguide capable of conducting light by internal reflection and having a first notch for collecting light emitted by the light source. The apparatus also comprises a second waveguide capable of conducting light by internal reflection and having a second notch for collecting light emitted by the light source. The first and second notches open towards the light source such that a space for the light source is formed between them. A first portion of the light emitted by the light source enters the first waveguide through the first notch, and a second portion of the light emitted by the light source enters the second waveguide through the second notch.

In accordance with yet another aspect of the invention, there is provided a light collecting apparatus that enables both local and distributed illumination. The apparatus comprises a waveguide capable of conducting light through internal reflection and having an angled input surface. This angled input surface collects light emitted by the light source and at least partially defines a notch. The apparatus also comprises an optical element capable of influencing light distribution and is located adjacent the waveguide at an axial position that is proximate the notch. The notch opens towards the light source such that a first portion of light emitted by the light source is collected by the angled input surface and conducted through the waveguide by internal reflection. A second portion of the light emitted by the light source passes through the waveguide at the angled input surface and impinges upon the optical element.

The light collecting apparatus can be utilized as part of an automotive interior illumination system that provides illumination to a variety of locations within an automobile.

Objects, features and advantages of this invention include providing a light collecting apparatus for use with an illumination system, wherein the apparatus is compact and includes a stacked waveguide configuration for efficiently collecting and distributing light from a light source to a plurality of areas.

DETAILED DESCRIPTION OF THE PREFERRED EMBODIMENT

Figure 1:
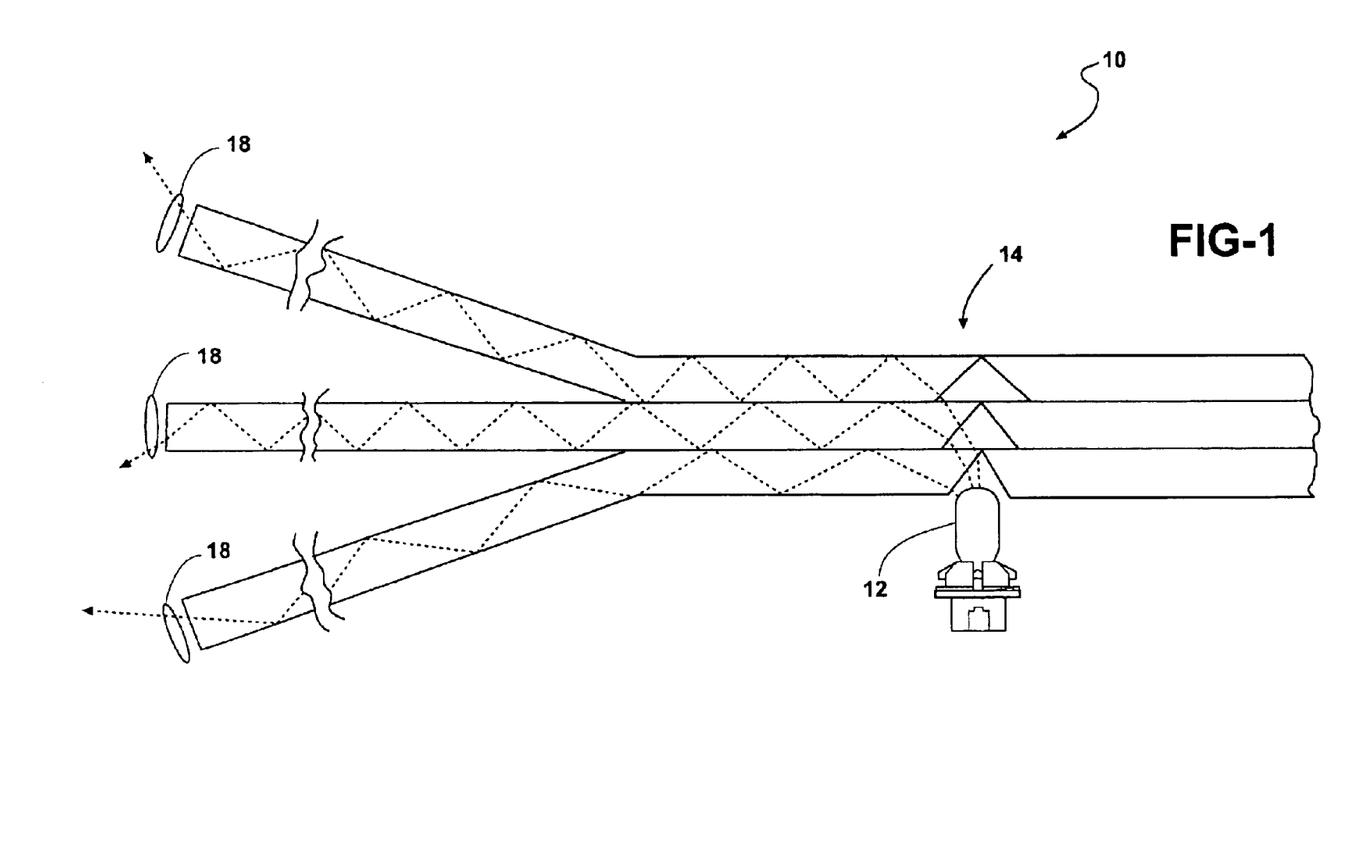
FIG. 1 depicts an embodiment of an illumination system of the present invention.

With reference to FIG. 1, there is shown a portion of an illumination system 10 that collects light from a light source 12 and distributes the collected light to different locations. The illumination system generally includes a light source 12, a light collector 14, and various optical elements 18. Light emitted by the light source is collected and distributed by the collector 14, such that a first portion of the total light is directed into a first waveguide, a second portion is directed into a second waveguide, and a third portion is directed into a third waveguide. After entering the first waveguide, the first portion of light is conducted throughout the length of the waveguide by internal reflection. Once the first portion of light reaches the end of the first waveguide, it exits the waveguide's axial end and impinges upon an optical element 18. The optical element 18 can comprise an end face of the waveguide, perhaps oriented at an angle to redirect the light exiting the waveguide, or it can comprise any one of a number of optical components, such as various types of lenses, optical switches, or other means for influencing the distribution of light. A similar process takes place in the other waveguides, thereby creating an illumination system capable of illuminating a plurality of remote locations with light stemming from a common light source. Accordingly, the illumination system of the present invention provides a light distribution network that is compact and efficient, thus being able to be implemented in applications having substantial spatial constraints.

Figure 2:
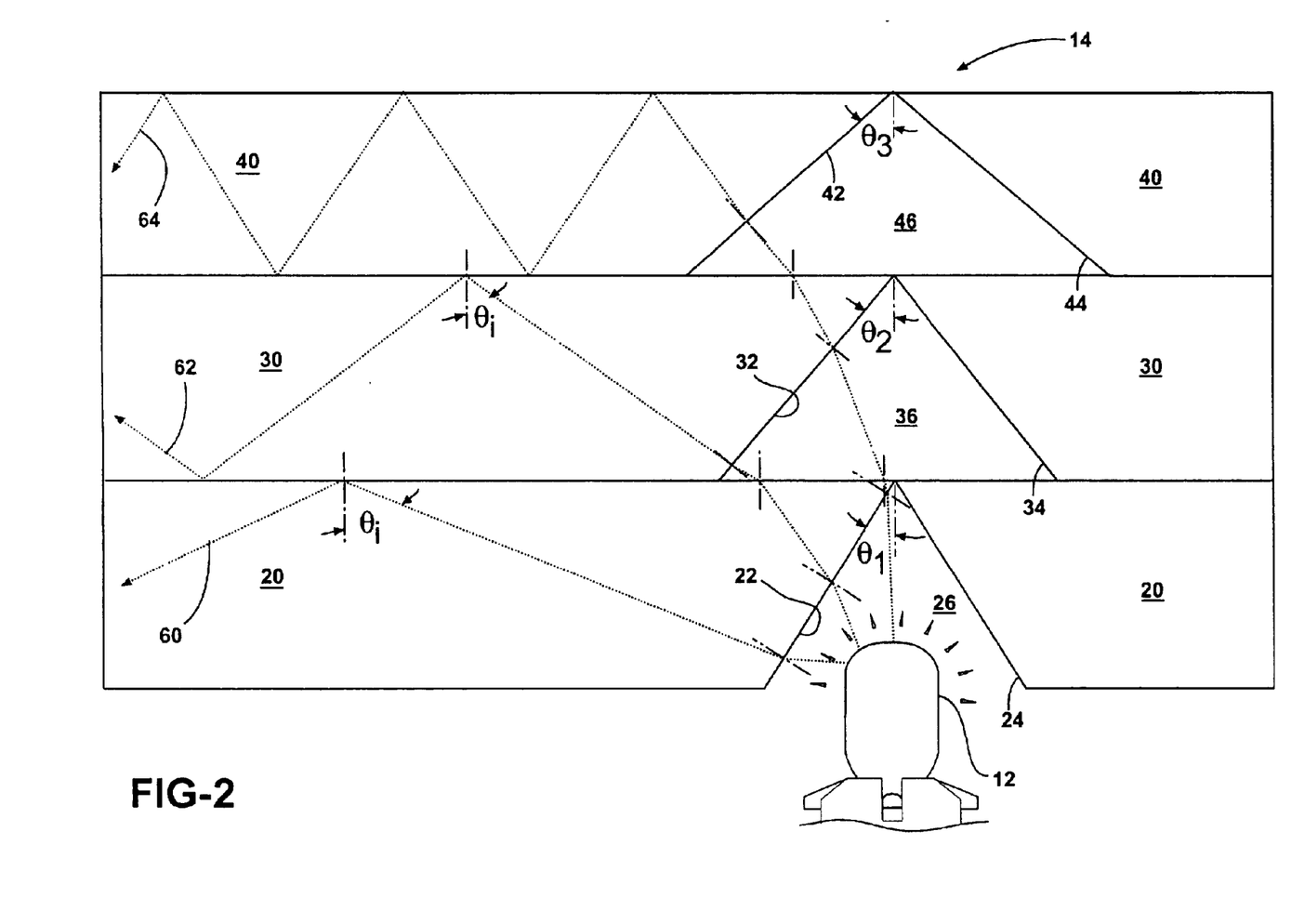
FIG. 2 is an enlarged view of a stacked light collector used in the illumination system of FIG. 1.

Referring now to FIG. 2, the light collector 14 seen in FIG. 1 is described in further detail. The collector discussed in this embodiment is arranged in a "stacked" configuration, and generally comprises a first waveguide 20 having two first angled input surfaces 22, 24, a second waveguide 30 having two second angled input surfaces 32, 34, and a third waveguide 40 having two third angled input surfaces 42, 44. In the embodiment shown, the first waveguide is a unitary light conducting segment whose elongated body has a rectangular cross-sectional shape and is interrupted by a first notch shaped space 26 formed by the opposing first angled input surfaces 22 and 24. A portion of the total light emitted by light source 12 impinges upon input surfaces 22 and 24, and a fraction of this impinged light is directed into first waveguide 20 for delivery to an optical element 18. Whether or not the light that strikes the input surfaces 22 and 24 will be directed into the first waveguide depends on the optical principals of refraction, reflection, and internal reflection and will be affected by factors such as the angle of incidence and the indices of refraction, as will be subsequently explained. As seen in FIG. 2, first angled input surface 22 forms an angle $\theta_1$ with a line normal to the upper longitudinal surface of first waveguide 20. The angle $\theta_1$ is chosen such that a particular portion or quantity of the total light emitted by the light source is captured and directed into the first waveguide, thereby resulting in internal reflection of that light through the waveguide.

Second waveguide 30 and third waveguide 40 are arranged such that they are generally parallel to the first waveguide and are situated on top of it in a stacked formation. The configuration of the second and third waveguides is similar to that previously described in relation to the first waveguide. Again, second and third waveguides 30, 40 are elongated light conducting components whose longitudinal lengths are interrupted by second and third notched shaped spaces 36 and 46, respectively. The axial position of the centers of notches 36 and 46 are substantially equal to the axial position of the center of notch 26. Though the positions of the different notched spaces are essentially equal, the angles forming them are not. In this embodiment, angle $\theta_2$ is formed between second angled input surface 32 and a line normal to the longitudinal surface of second waveguide 30, and is greater than angle $\theta_1$. Likewise, angle $\theta_3$ is formed by the third angled input surface 42 and a line normal to the longitudinal surface of waveguide 40, and is greater than both angle $\theta_1$ and angle $\theta_2$. The reasoning for having increasingly greater input angles is to allow those waveguides further away from the light source to have an increasingly greater ability of capturing a portion of the light emitted from the light source, as will be subsequently described in further detail.

Although light collector 14 has thus far been described in specific reference to the embodiment shown in FIG. 2, there are many variations that can be utilized without departing from the scope of the present invention. For instance, instead of the waveguides being unitary pieces interrupted by the notch shaped spaces, they could each be comprised of two separate light conducting components where each component has an angled axial end such that when abutted together the two angles form a notch similar to that seen in FIG. 2. Alternatively, some or all of the notches can extend only partway into the waveguide and can have curved or multifaceted surfaces. Also, the angled input surfaces for any one waveguide could be spaced further apart than shown in the figures with an open area or flat section spanning the two surfaces. The cross-sectional shapes of the waveguides do not have to be rectangular, as they could be circular, oval, pentagonal, etc. Furthermore, these separate components could either have the same composition or they could have different compositions with different optical properties.

Figure 3:
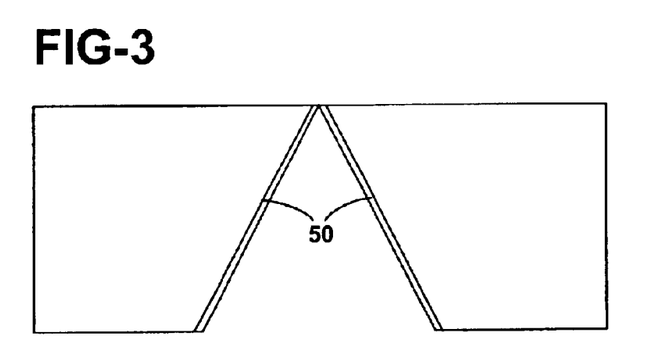
FIG. 3 is an enlarged view of a waveguide, similar to the waveguide seen in the stacked light collector shown in FIG. 2, having surface features.
Figure 4:
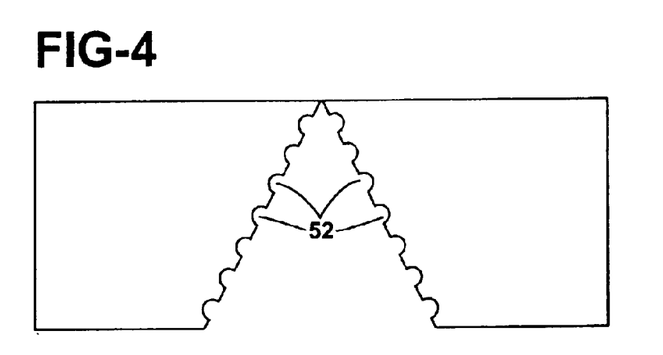
FIG. 4 is an enlarged view of a waveguide, similar to the waveguide seen in the stacked light collector shown in FIG. 2, having indentations.

FIGS. 3 and 4 show surface features that have been added to the angled input surfaces, thus affecting the amount of light directed into the corresponding waveguide. In FIG. 3, the surface feature consists of an optical coating 50 that could be added to either of the input surfaces or both of them. The optical coating would typically be chosen for its optical properties, such as its index of refraction, thereby affecting the amount of light directed into its respective waveguide branch. FIG. 4 reveals surface features consisting of a series of indentations 52. Indentations located along the input surface will disperse light in such a manner that the total amount of light directed into the waveguide can be affected. Changing the size, shape, or other characteristics of the indentations may further influence the light collection. Thus, any number of surface features may be added to the input surfaces of the waveguides in order to affect the light collection characteristics, and can be used without departing from the scope of the present invention.

Figure 5:
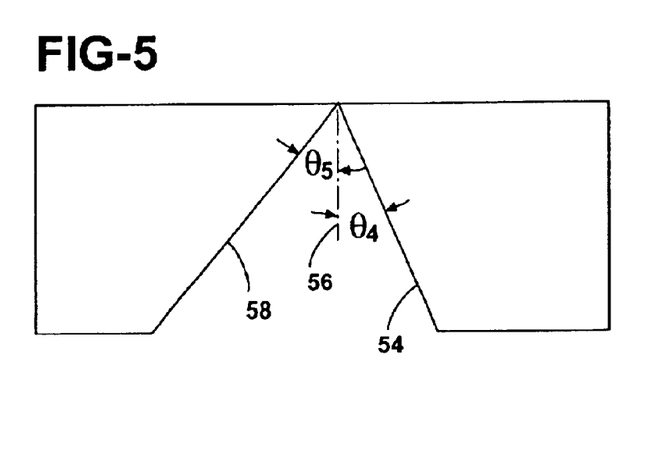
FIG. 5 is an enlarged view of a waveguide, similar to the waveguide seen in the stacked light collector shown in FIG. 2, having angled input surfaces that form unequal angles.

FIG. 5 discloses an additional alternative arrangement of the light collector 14, wherein the two angled input surfaces form unequal angles. Angle $\theta_4$ is formed between input surface 54 and line 56 which is normal to the longitudinal surface of the waveguide. As seen in the drawing, this angle is less than angle $\theta_5$ which is formed by the same line 56 and the input surface 58. The unequal angles making up the notched shaped space will influence the amount of light directed into each channel of the waveguide, as the angle of incidence is an important factor in determining whether or not light is reflected into the waveguide. Other variations, such as having either angle $\theta_4$ or angle $\theta_5$ approach 0°, can be used as well.

Referring back now to FIG. 2, the operation of the present invention will be briefly explained with respect to several rays of light emitted from the light source at different angles. This explanation is not intended to specifically show the angles involved in actual operation, nor is it a complete account of all optical events actually occurring. Rather, this explanation is intended to provide a general description of how different portions of light are distributed into the various waveguides.

In general, light is emitted from light source 12 and a portion of that light impinges upon one of the first angled input surfaces 22, 24. A part of that impinging light is directed into first waveguide 20 and subsequently distributed throughout the length of the waveguide to some remote location, where the light exits the axial end of the waveguide and passes through an optical element 18 that focuses, disperses, or otherwise influences its distribution. The part of the impinging light that is not directed into the first waveguide is passed to the second waveguide 30 where a similar process takes place. Again, a portion of the total light that impinges the second waveguide is directed into that waveguide for distribution while the remaining portion of light is passed on to the third waveguide 40. Consequently, light collector 14 partitions the light that strikes it into different light conducting channels where the light is then distributed to various locations around the illumination system.

Considering the operation in greater detail, a first light ray 60 is emitted from the light source and strikes first angled input surface 22. Due to the boundary between different indices of refraction and the assumption that first waveguide 20 has a greater index of refraction than the surrounding air environment, light ray 60 is refracted and bent inward towards the line normal to the angled input surface, as is commonly known in the art. After entering the waveguide, ray 60 impinges the outer surface of the waveguide at an angle $\theta_i$ which is greater than an angle referred to as the critical angle $\theta_c$ ($\theta_i > \theta_c$). Accordingly, light ray 60 reflects off of this outer surface and is conducted throughout the length of the waveguide by internal reflection. Light ray 62 is also emitted from the light source and strikes input surface 22. After being refracted in a manner similar to that previously described, the ray impinges the outer surface of first waveguide 20. In this case, however, the angle of incidence is less than the critical angle, ($\theta_i < \theta_c$), and thus light ray 62 is not internally reflected, rather, it is transmitted out of the first waveguide such that it strikes input surface 32. At this interface, the light ray is again refracted and enters second waveguide 30. As seen from the drawing, the light ray strikes the outer surface of the second waveguide at an angle $\theta_i$, where $\theta_i > \theta_c$. Consequently, light ray 62 is internally reflected within second waveguide 30 and conducted along its length. In a similar fashion, light ray 64 passes through first and second waveguides until it impinges input surface 42, where the ray is refracted into third waveguide 40. Once again, the ray experiences internal reflection within the third waveguide and is routed to a remote location, as previously explained.

Thus, the light collector of the present invention utilizes optical properties to distribute light from a light source to various locations throughout the illumination system. It should be noted that the collector 14 could utilize different material compositions and thus different indices of refraction in the various waveguides to achieve a result similar to that described. Other variations of the stacked waveguide described herein can be used without departing from the scope of the present invention.

Figure 6:
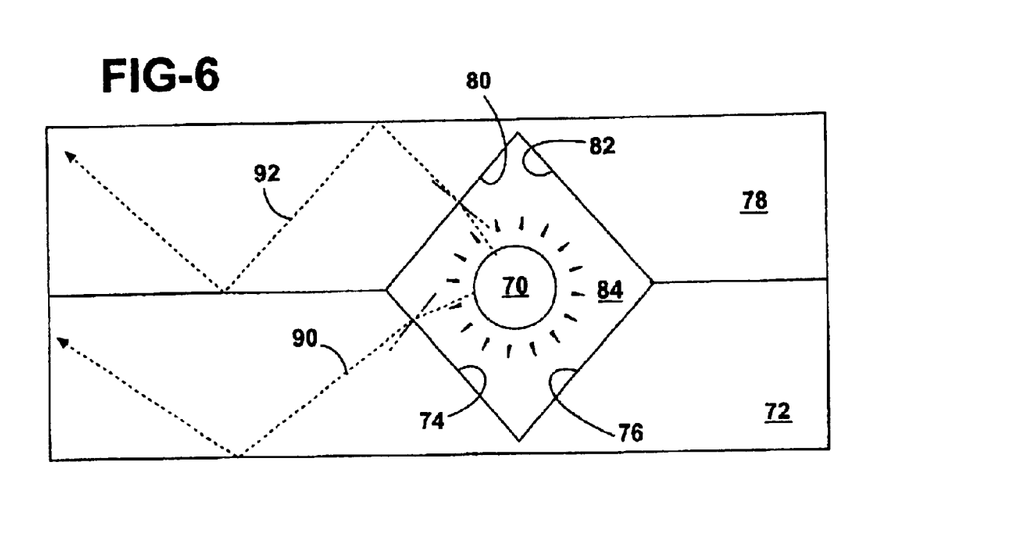
FIG. 6 is an enlarged view of an alternative embodiment of the stacked light collector shown in FIG. 2.

Referring now to FIG. 6, there is seen an alternative embodiment of the stacked light collector portion of the illumination system shown in FIG. 1. The light collector includes a light source located in an internal space created by the angled input surfaces of two separate waveguides and where a portion of the total light emitted is collected and distributed by the first waveguide and another portion is collected and distributed by the second waveguide. This embodiment generally comprises a light source 70, a first waveguide 72 having first angled input surfaces 74, 76, and a second waveguide 78 having second angled input surfaces 80, 82. As seen, the four angled input surfaces create an internal space 84 between the waveguides. This space is totally enclosed except for an opening through which light source 70 extends. The internal space 84 shown is of a diamond configuration, however, it could be one of a number of other shapes, including a circle, oval, pentagon, hexagon, etc. Many of the waveguide and input surface characteristics previously explained are applicable here, consequently a detailed description of this embodiment's structure is deemed unnecessary and is consequently omitted.

In use, a portion of the total light emitted by light source 70 impinges the first angled input surfaces 74, 76, and an example of this is illustrated by light ray 90. Light ray 90 strikes input surface 74 and is refracted as it enters first waveguide 72. As previously described, the light travels down the length of the first waveguide according to the principals of internal reflection. Similarly, light ray 92 impinges angled input surface 80 and is refracted into second waveguide 78. In this manner, a first portion of the total light radiated from light source 70 is collected by first angled input surfaces 74, 76 and distributed through the first waveguide to a distant location, and a second portion of the total light is collected by the input surfaces 80, 82 and distributed throughout the second waveguide. The compact configuration of this light collector allows for its implementation in lighting applications where the spatial constraints are strict, such as in various types of automotive interior lighting applications.

Figure 7:
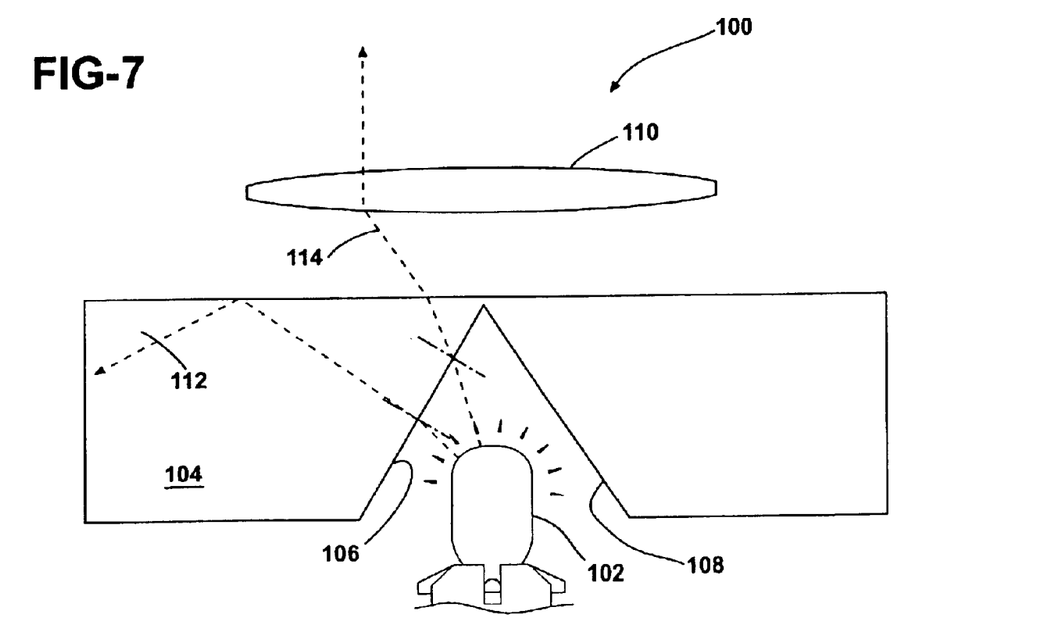
FIG. 7 is an enlarged plan view of an alternative light collector arrangement utilizing a lens to redirect uncollected light passing laterally through the light collector.

In the embodiment of FIG. 7, there is shown a light source 102, waveguide 104 with angled input surfaces 106, 108, and an optical element 110. Instead of utilizing a stacked waveguide configuration, such as those previously seen, collector 100 uses a waveguide in conjunction with a lens, or other optical element, to distribute light in the desired manner.

In operation, light collector 100 receives light from the light source 102. A first portion of that light strikes the angled input surfaces and is channeled into waveguide 104 for distribution to a remote area, while a second portion of the light received by apparatus 100 is transmitted through the waveguide and impinges the adjacently positioned lens 110. For illustrative purposes, light ray 112 is shown emanating from light source 102 and impinging angled input surface 106 of the waveguide. As previously explained, the light ray is refracted into the interior of waveguide 104, where it is internally reflected throughout the length of the waveguide. A second light ray 114 strikes input surface 106, is refracted as it enters the waveguide, impinges the back surface of the waveguide where it exits, and continues until it strikes lens 110. As mentioned, the lens can be one of any number of optical devices used to affect the distribution of light, and is depicted as a double convex lens in this particular embodiment. Once light ray 114 strikes the lens, it is distributed such that it illuminates a desired area proximate the lens. Accordingly, collector 100 of this embodiment collects light from a light source where a first portion of the collected light is directed into a waveguide for distribution, and a second portion is transmitted out of the waveguide such that it impinges an adjacently positioned lens for illumination of the surrounding area.

As will be appreciated, a lens can also be used in other embodiments to utilize light from the light source that is not captured by the waveguides. For example, a lens could be placed above the internal space 84 where light source 70 is located in FIG. 6 with this light source and lens being positioned relative to an object or area for which illumination is desired. This helps maximize the light collection and utilization from the light source.

It will thus be apparent that there has been provided in accordance with the present invention a light collector and illumination system which achieves the aims and advantages specified herein. It will, of course, be understood that the forgoing description is of preferred exemplary embodiments of the invention and that the invention is not limited to the specific embodiments shown. Various changes and modification will become apparent to those skilled in the art and all such changes and modifications are intended to be within the scope of the present invention.

We claim:

1. A light collecting apparatus for collecting and distributing light in an illumination system having a light source, said apparatus comprising:
   a first waveguide capable of conducting light by internal reflection and having a first angled input surface for collecting light emitted by the light source,
   a second waveguide capable of conducting light by internal reflection and having a second angled input surface for collecting light emitted by the light source, wherein said first and second waveguides are stacked, and said first and second angled input surfaces are oriented at different angles such that a first portion of the light emitted by the light source is collected by said first angled input surface and conducted through said first waveguide by internal reflection and a second portion of the light emitted by the light source is collected by said second angled input surface and conducted through said second waveguide by internal reflection.

2. The light collecting apparatus of claim 1, wherein said first waveguide is a unitary piece of light conducting material.

3. The light collecting apparatus of claim 1, wherein said first waveguide comprises at least two separate pieces of light conducting material.

4. The light collecting apparatus of claim 1, wherein said first and second angled input surfaces at least partially define first and second notches within said first and second waveguides, respectively.

5. The light collecting apparatus of claim 4, wherein said first and second notches open in the same direction.

6. The light collecting apparatus of claim 4, wherein said first notch comprises said first angled input surface and an additional angled input surface oriented at an angle unequal to that of said first angled input surface.

7. The light collecting apparatus of claim 1, wherein said first angled input surface includes a surface feature capable of influencing the distribution of light that impinges said feature.

8. The light collecting apparatus of claim 1, wherein said first and second waveguides lie in a generally parallel orientation.

9. The light collecting apparatus of claim 1, wherein said first waveguide is disposed between the light source and said second waveguide such that said second portion of light passes through said first waveguide without internally reflecting within said first waveguide.

10. The light collecting apparatus of claim 9, wherein said first waveguide is disposed between the light source and said second waveguide such that the second portion of light passes through said first angled input surface and cuts a lateral side of said first waveguide before entering said second angled input surface.

11. The light collecting apparatus of claim 1, wherein said first and second waveguides are formed from different materials.

12. The light collecting apparatus of claim 1, further comprising a third waveguide stacked with said first and second waveguides, said third waveguide including a third angled input surface oriented at an angle that is different than the angle of either said first or second angled input surfaces such that a third portion of the light emitted by the light source is collected by said third angled input surface and conducted through said third waveguide by internal reflection.

13. A light collecting apparatus for collecting and distributing light in an illumination system having a light source, said apparatus comprising:
   a first waveguide capable of conducting light by internal reflection and having a first notch for collecting light emitted by the light source, and
   a second waveguide capable of conducting light by internal reflection and having a second notch for collecting light emitted by the light source, wherein said first and second notch for collecting light emitted by the light source, wherein said first and second notches open towards the light source thereby creating a space for the light source between said first and second notches such that a first portion of the light emitted by the light source enters said first waveguide through said first notch and a second portion of the light emitted by the light source enters said second waveguide through said second notch.

14. The light collecting apparatus of claim 13, wherein said space is generally of a diamond shape.

15. The light collecting apparatus of claim 13, wherein said space is generally of a circular shape.

16. The light collecting apparatus of claim 13, wherein said first and second waveguides lie in a generally parallel orientation.

17. The light collecting apparatus of claim 13, wherein said space is a closed space except for an opening through which the light source extends.

18. An automotive interior illumination system for collecting light and distributing the collected light to a plurality of areas, said system generally comprising:
   a light source for emitting light,
   a first waveguide capable of conducting light by internal reflection and having a first angled input surface for collecting light emitted by said light source,
   a second waveguide capable of conducting light by internal reflection and having a second angled input surface for collecting light emitted by said light source, a first optical element located proximate one end of said first waveguide such that at least a portion of the light exiting the one end of the first waveguide impinges upon said first optical element, and a second optical element located proximate one end of said second waveguide, such that at least a portion of the light exiting the one end of said second waveguide impinges upon said second optical element, wherein said first and second waveguides are stacked, and said first and second angled input surfaces are oriented at different angles such that a first portion of the light emitted by said light source is collected by said first angled input surface and conducted through said first waveguide by internal reflection, and a second portion of the light emitted by said light source is collected by said second angled input surface and conducted through said second waveguide by internal reflection.

19. The illumination system of claim 18, wherein at least one of said optical elements comprises a lens.

* * * * *

UNITED STATES PATENT AND TRADEMARK OFFICE
CERTIFICATE OF CORRECTION

PATENT NO. : 6,915,039 B2
DATED : July 5, 2005
INVENTOR(S) : Joe Parton Young and George Robert Hulse It is certified that error appears in the above-identified patent and that said Letters Patent is hereby corrected as shown below:

Column 8,
Line 12, replace "cuts" with -- exits --.

Signed and Sealed this

Twenty-ninth Day of November, 2005

JON W. DUDAS
*Director of the United States Patent and Trademark Office*